June 25, 1963 R. G. POHL 3,094,764

APPARATUS FOR MANUFACTURING SEMI-CONDUCTOR DEVICES

Filed April 3, 1957 6 Sheets-Sheet 1

INVENTOR.
Robert G. Pohl
BY John J. Pedersen
Attorney

June 25, 1963 R. G. POHL 3,094,764

APPARATUS FOR MANUFACTURING SEMI-CONDUCTOR DEVICES

Filed April 3, 1957 6 Sheets-Sheet 2

INVENTOR.
Robert G. Pohl
BY John J. Pederson
Attorney

INVENTOR.
Robert G. Pohl
BY John J. Pedersen
Attorney

APPARATUS FOR MANUFACTURING SEMI-CONDUCTOR DEVICES

Filed April 3, 1957 6 Sheets-Sheet 4

INVENTOR.
Robert G. Pohl
BY John J. Pederson
Attorney

APPARATUS FOR MANUFACTURING SEMI-CONDUCTOR DEVICES

Filed April 3, 1957 6 Sheets-Sheet 5

INVENTOR.
Robert G. Pohl
BY John J. Pederson
Attorney

June 25, 1963 R. G. POHL 3,094,764

APPARATUS FOR MANUFACTURING SEMI-CONDUCTOR DEVICES

Filed April 3, 1957 6 Sheets-Sheet 6

INVENTOR.
Robert G. Pohl
BY John J. Pederson
Attorney

United States Patent Office 3,094,764
Patented June 25, 1963

3,094,764

APPARATUS FOR MANUFACTURING SEMI-CONDUCTOR DEVICES

Robert G. Pohl, Chicago, Ill., assignor to The Rauland Corporation, a corporation of Illinois
Filed Apr. 3, 1957, Ser. No. 650,450
17 Claims. (Cl. 29—25.3)

This invention relates to a new and improved apparatus for manufacturing semi-conductor devices. More particularly, it has to do with apparatus for manufacturing transistors and related devices having alloy junctions.

At present, one widely used fabricating technique for the manufacture of transistors and related devices is based upon the alloying of a small quantity of a modifier element into a semi-conductor crystal. The essential physical property utilized in this method is the solubility of the semi-conductor, most commonly germanium or silicon, in liquid solutions of various other elements. The alloying process is carried out at a temperature well below the melting point of the semi-conductor, whereby the basic semi-conductor crystal lattice is not altered. The relatively high values of current gain obtained with transistors of the alloy-junction type indicate that modifier-element atoms diffuse a very small distance into the bulk of the non-dissolved crystal lattice while the semi-conductor and modifier are maintained at the alloying temperature.

Although semi-conductor devices employing alloy-type junctions are now in wide spread commercial use, there have been certain basic difficulties in the conventional alloying process which yield an undesirably high reject rate during manufacture. One such problem has been attributed to the fact that introduction of the modifier element atoms into the semi-conductor crystal lattice tends to take place irregularly over the surface of the semi-conductor. As a consequence, it has been extremely difficult to control the thickness of the semi-conductor layer underlying the alloy junction; in addition, the backward impedance of a device manufactured by the usual alloying techniques is not as high as could be desired. A solution to these problems is provided by the method described and claimed in the copending application of Robert G. Pohl, entitled Method of Preparing Semi-Conductor Junctions, Serial No. 576,409, filed April 5, 1956, now abandoned, and assigned to the same assignee as the present application. Briefly, that application teaches the application of vibratory energy, preferably including ultrasonic frequencies, to the modifier during one or more steps of the alloying procedure.

One object of the present invention is to provide apparatus for manufacturing alloy-junction semi-conductor devices which is capable of producing the devices continuously and successively with a rapidity substantially greater than that practicable with prior known apparatus.

It is another object of the present invention to provide apparatus of the foregoing character which is readily and completely adaptable to automatic operation.

A further object of the present invention is to provide a new and novel apparatus for the manufacture of alloy-junction semi-conductor devices which is characterized by the compactness of the entire assembly as compared with prior known apparatus.

Another object of the present invention is to provide apparatus for the manufacture of alloy-junction semi-conductor devices which is capable of producing such devices with precision in rapid succession and with an excellent reproducibility of the essential operating characteristics of the devices.

A still further object of the present invention is to provide apparatus of the foregoing character which is economical to operate, inexpensive to fabricate and install, and which is capable of operating continuously with a minimum of supervision and maintenance.

Still another aim of the present invention is to provide an apparatus of such character in which a single, unitary assembly accepts the basic materials or component parts of the device and performs all of the steps necessary to complete the formation of the devices.

A still further object of the present invention is to provide improved apparatus for forming a pair of alloy-junctions precisely opposite one another on a body of semi-conductive material.

In accordance with a broad overall aspect of the present invention, the apparatus finds its utility in the manufacture of a semi-conductor device. It includes means for deforming one end of a straight wire member into a loop lying in a plane transverse of the wire member. A liquid of predetermined viscosity is then applied to the loop by means on the apparatus. The apparatus further includes means for disposing the loop against a pellet of modifier material to suspend the pellet from the loop by virtue of surface tension forces in the liquid. Means on the apparatus then applies heat to the loop and suspended pellet to melt the pellet and form a droplet of the pellet material on the loop. A surface on a body of semi-conductive material is then, by means on the apparatus, disposed adjacent the droplet. Finally, there is provided means, including means for heating the droplet in accordance with a predetermined time-temperature cycle, for forming an alloy junction between the droplet and the body.

In a preferred form of the apparatus, and in accordance with one aspect of the present invention, the alloy-junction-forming means comprises means, including the means for disposing the body surface adjacent the droplet, rotatable about a first predetermined axis and movable therealong between first and second positions for holding and applying heat to the semi-conductive body. The wire member is supported by means for feeding it along a second predetermined axis intersecting the body held by the rotatable means at the second position. The deforming means, liquid applying means, loop disposing means, and the loop and pellet heating means together constitute a plurality of process stations, and the apparatus further includes means for moving the process stations along a predetermined path to successively dispose individual different ones of the stations at the second position intersected by the second predetermined axis.

The invention is also directed to, and the attainment of the foregoing objects is enhanced by, a number of more detailed features. These other aspects of the present invention relate generally to the structure of the rotatable holding means, the wire feeding means, and to the structure of the apparatus forming the different process stations. Included is a unique apparatus for forming a loop in the end portion of and lying transverse to the wire, a multiple-rinse bath which permits successive rinses of portions of the device at a single station-position, and another new and novel bath which permits successive immersing of the lower end portions of a succession of members each to the same predetermined depth. Also associated with the assembly but not herein claimed as such is an extremely simple and very efficient device for loading a germanium wafer into a base tab, the loaded base tab then being processed in the apparatus.

The features of the invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

Figure 1:
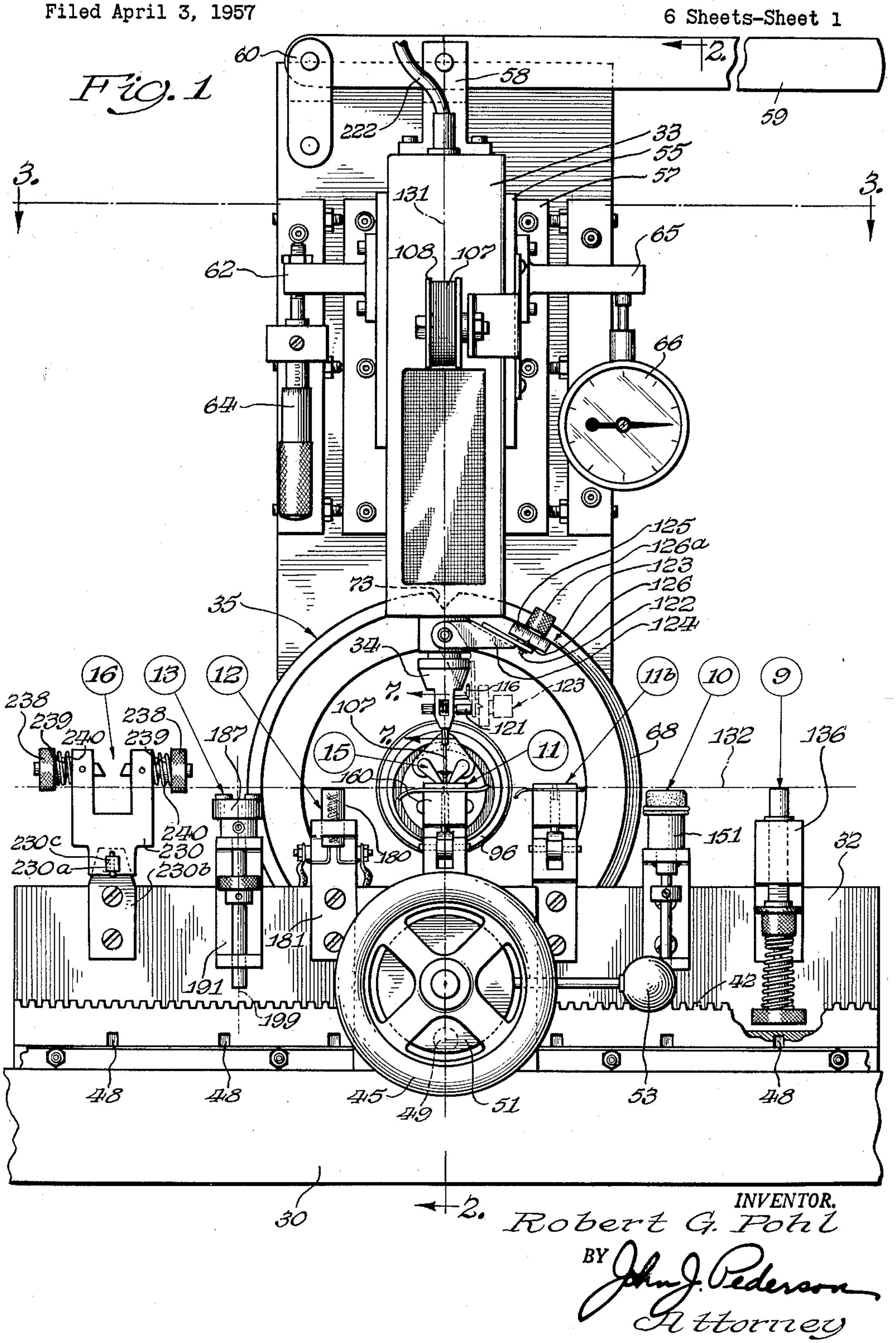
FIGURE 1 is a front view of apparatus constructed in accordance with the present invention and generally illustrates the complete assembly including the various different processing stations.
Figure 3:
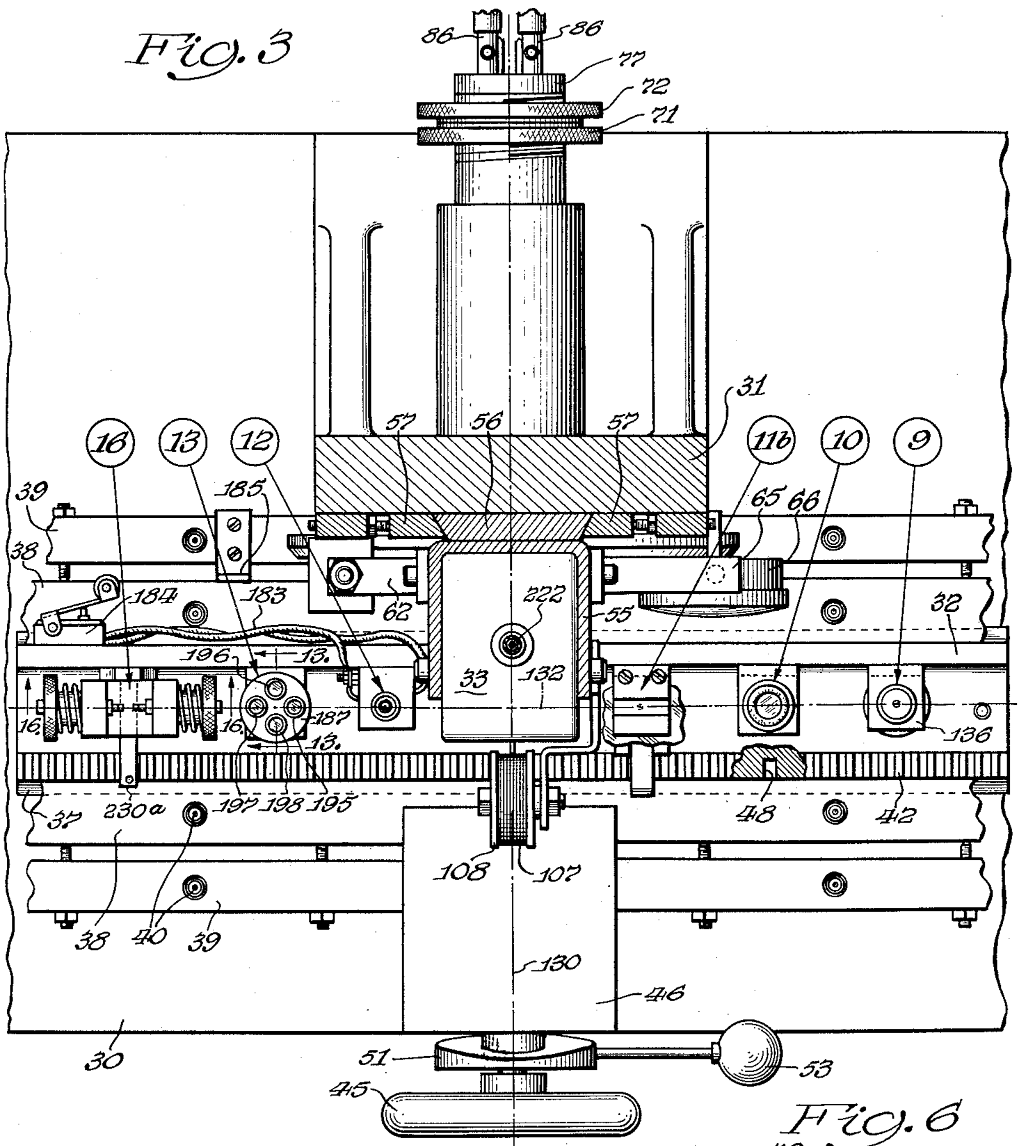
FIGURE 3 is a view, partially in cross-section, taken along the line 3—3 in FIGURE 1.
Figures 5, 6:
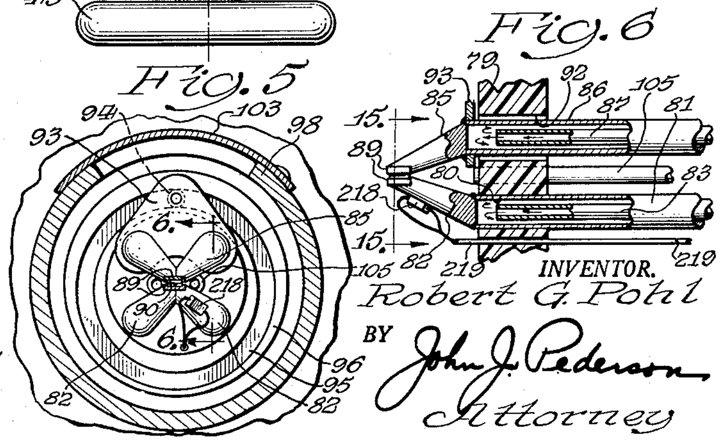
FIGURE 5 is a fragmentary cross-sectional view taken along the line 5—5 in FIGURE 2.
FIGURE 6 is a fragmentary cross-sectional view taken along line 6—6 in FIGURE 5.
Figures 9, 9A, 9B, 9C, 10, 11, 11A, 11B:
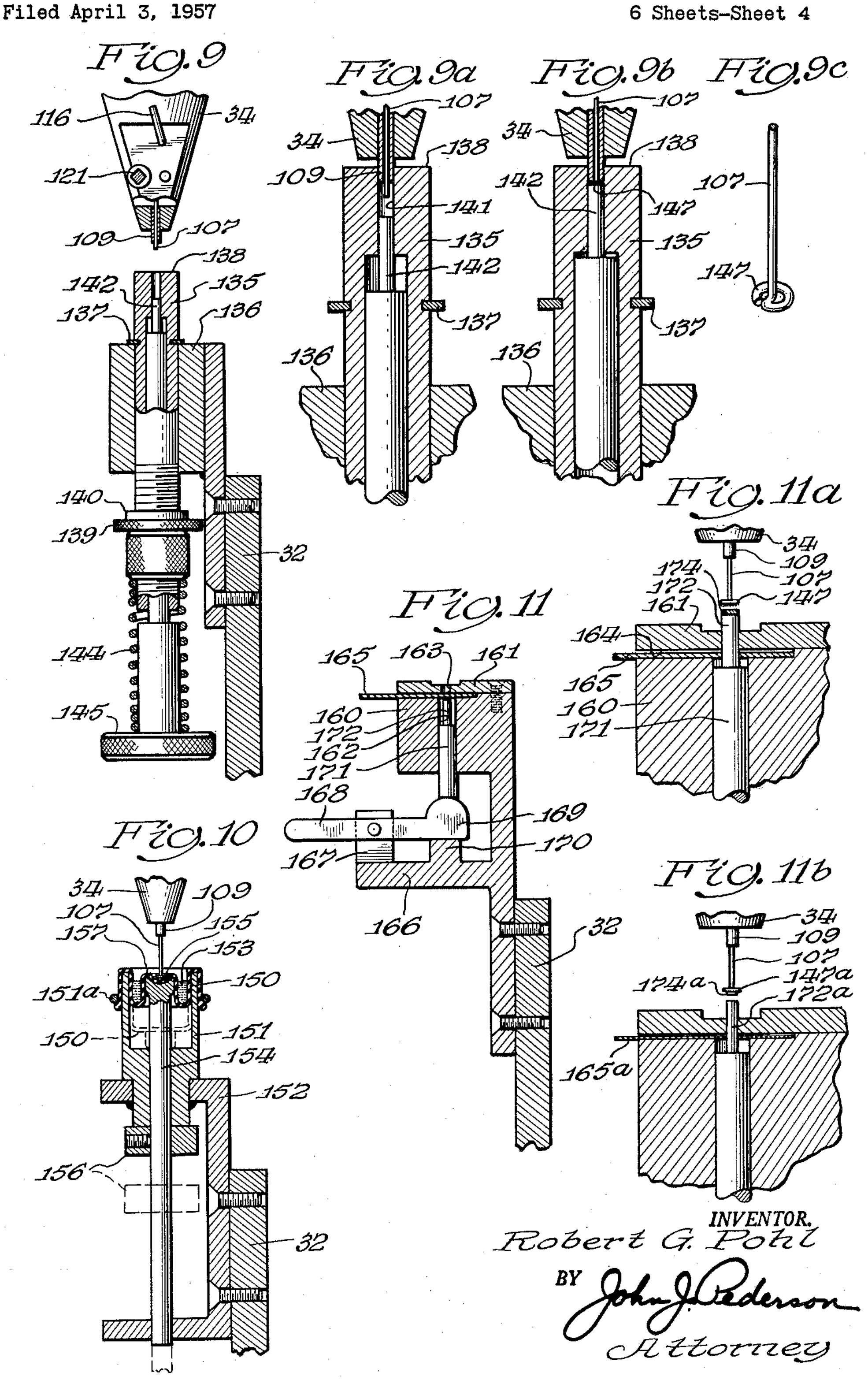
FIGURE 9 is a fragmentary cross-sectional view taken along line 2—2 in FIGURE 1 but with the parts disposed differently to position another station along such line.
Figure 12:
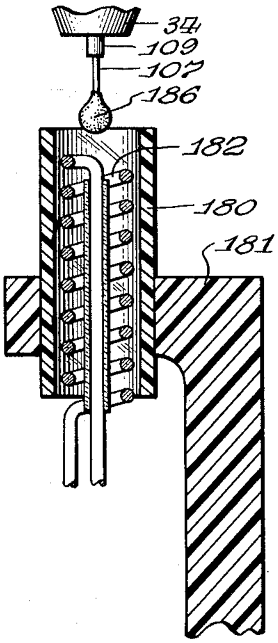
Figures 14, 14A, 15, 15A, 16:
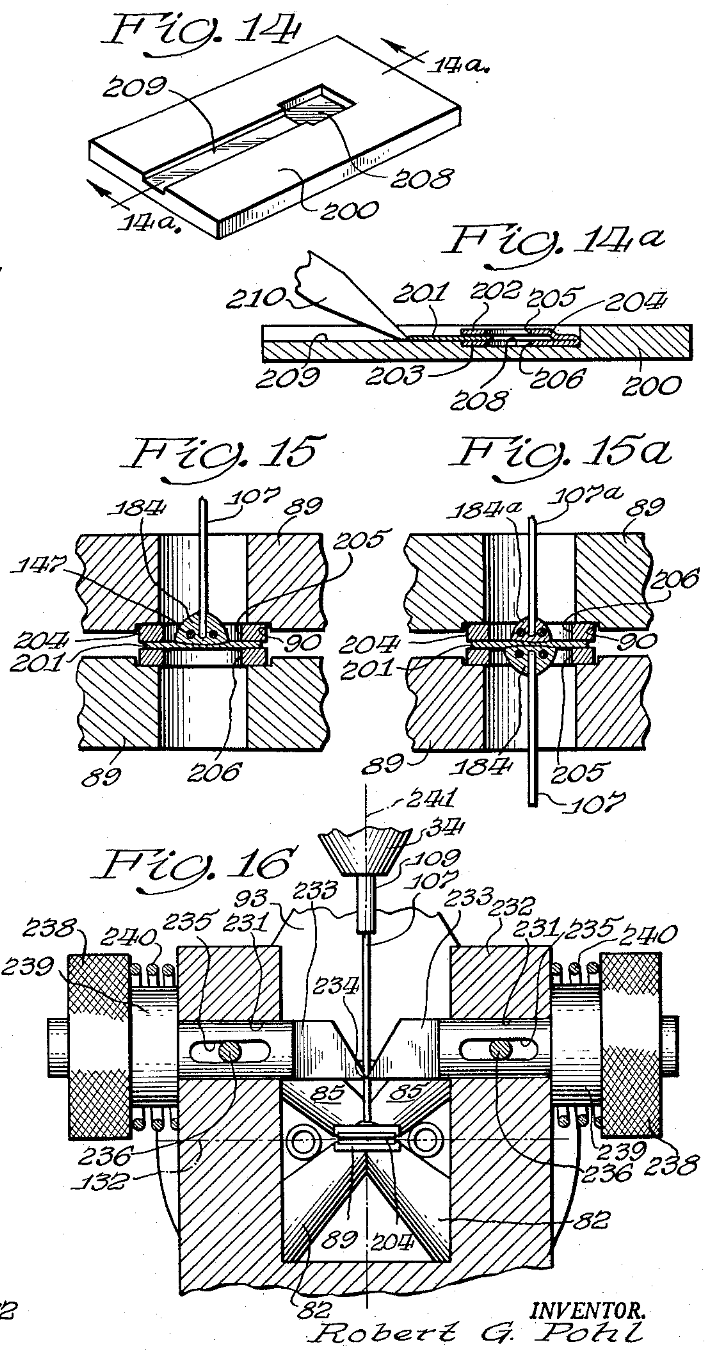
Figure 13:
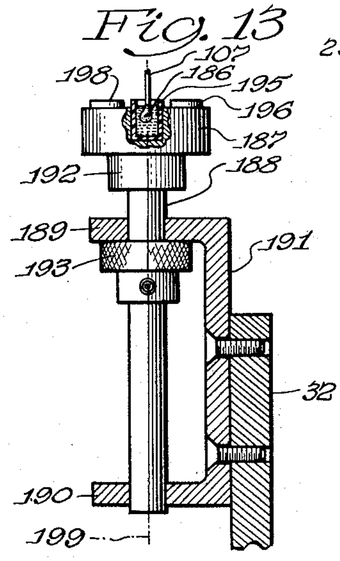
Figures 17, 18, 19, 20:
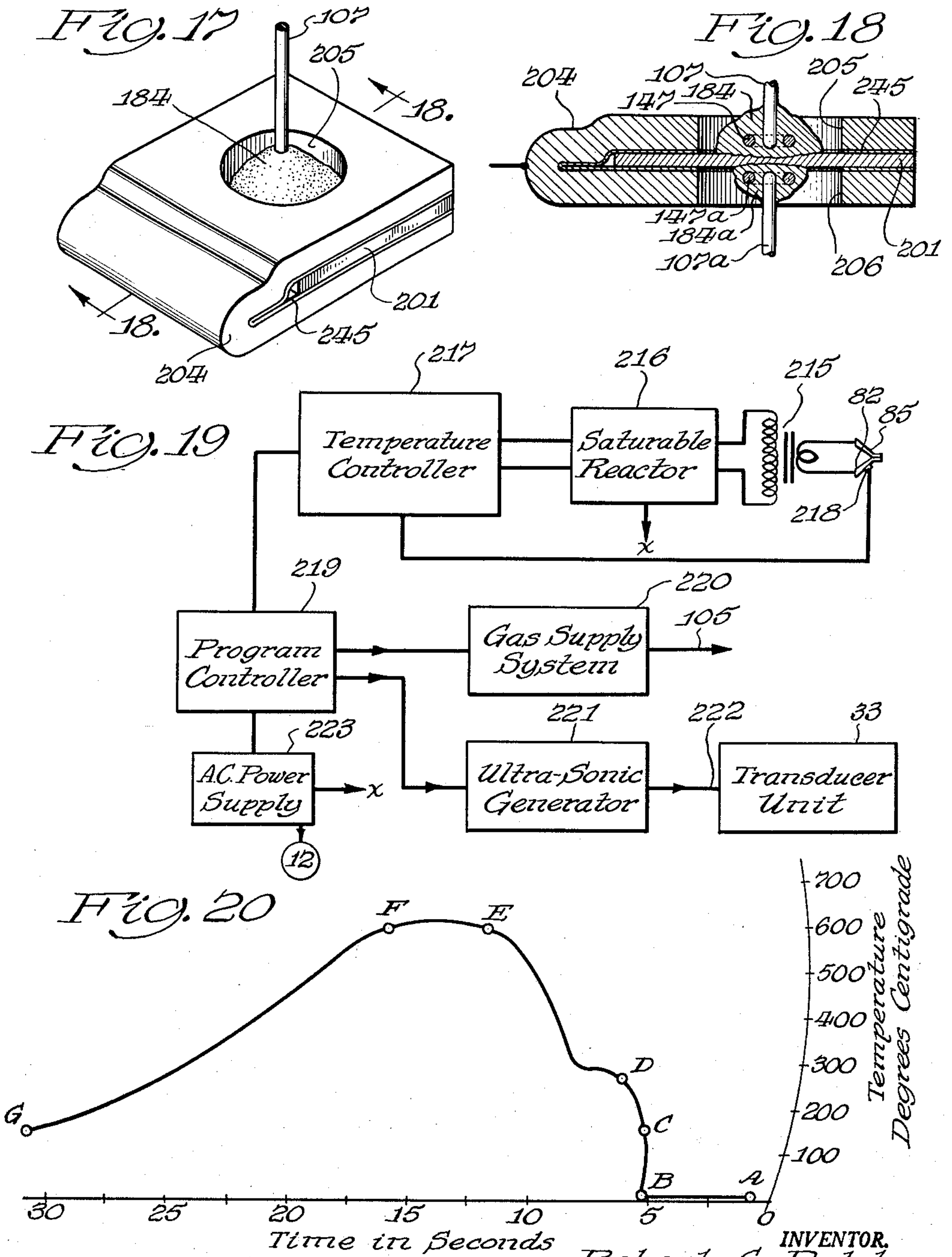

FIGURES 9*a* and 9*b* are views similar to FIGURE 9 but with certain of the parts in different positions, while FIGURE 9*c* is an enlarged perspective view of a wire deformed by the apparatus of FIGURES 9, 9*a* and 9*b*;

FIGURE 10 is a view taken similarly to FIGURE 9 but with the parts disposed to position a still different station along line 2—2;

FIGURE 11 is a view taken similarly to FIGURE 10 but with still another station disposed along line 2—2 in FIGURE 1;

FIGURE 11*a* is a view similar to FIGURE 11 but with certain of the parts at different positions;

FIGURE 11*b* is a view similar to FIGURE 11*a* but denotes a second similar station and shows certain of the parts in a slightly different position;

FIGURE 12 is a view taken similarly to FIGURE 9 but shows yet another station positioned along line 2—2 in FIGURE 1;

FIGURE 13 is a view also taken similarly to FIGURE 9 but likewise shows yet another station positioned along line 2—2 of FIGURE 1;

FIGURE 14 is a perspective view of an assembly block associated with the apparatus of FIGURE 1;

FIGURE 14*a* is a cross-sectional view taken along the line 14*a*—14*a* in FIGURE 14 and shows the assembly block in use;

FIGURE 15 is a fragmentary cross-sectional view taken along the line 15—15 in FIGURE 6;

FIGURE 15*a* is a view similar to FIGURE 15 but with the parts in a different position and is taken at a different stage in the overall process;

FIGURE 16 is a fragmentary sectional view taken along line 16—16 in FIGURE 3 but with that station positioned across line 2—2 in FIGURE 1;

FIGURE 17 is a perspective view of a semi-conductor device manufactured on the apparatus of the present invention;

FIGURE 18 is a cross-sectional view taken along line 18—18 in FIGURE 17;

FIGURE 19 is a wiring diagram for the apparatus of the present invention; and

FIGURE 20 is a curve illustrating certain conditions that exist during the actual formation of an alloy junction created with the apparatus of the present invention.

Before discussing in detail the apparatus which forms the preferred embodiment of the present invention, a brief description of the alloying process to which the present apparatus is directed is desirable in order to more easily understand and appreciate the characteristics of the apparatus. The basic semi-conductor material in the conventional process usually comprises silicon or germanium. A small, thin wafer of semi-conductive material is employed; in a typical instance, the wafer may be approximately 0.075″ square and 0.003″ thick. The length and width of the wafer are usually not critical and are selected to provide a surface of adequate base-contact area without wasting the semi-conductive material. The thickness is of greater importance in determining the characteristics of the complete device, but also may vary within substantial limits since the alloying process itself determines to a substantial extent the ultimate effective thickness of he wafer in the critical area underlying the alloy junctions. The wafer is cut from a single crystal of semi-conductor material, since any discontinuity in the crystal lattice may lead to highly unpredictable and undesirable chacteristics in the finished device. The semi-conductive material usually exhibits either n-type or p-type conductivity characteristics; for some applications, it may be of the intrinsic variety.

Assuming that n-type germanium is selected as the basic semi-conductive material, the modifier element employed in the conventional process may comprise an acceptor element having a melting point substantially lower than that of germanium; indium is most commonly employed. Where p-type semi-conductive material is utilized as the basic semi-conductor, an antimony alloy or some other suitable donor may be used as a modifier. Using the n-type germanium with indium as a modifier, a small quantity of the latter is deposited upon one surface of the germanium wafer and, in the conventional process, the semi-conductor and modifier are heated to a temperature above the melting point of the indium but below that of the germanium for a period of time sufficient to melt the indium and dissolve a portion of the germanium into the indium, whereby an alloy junction is formed.

The apparatus of the present invention basically employs such a prior art process in the formation of the alloy junction but goes much further and also preferably adopts certain refinements and improvements on the basic technique which refinements and improvements are described and claimed in the aforementioned copending application. Briefly, this improved process includes the depositing of a small quantity of the selected modifier upon the surface of the wafer after which at least a portion of the modifier is then heated to a temperature above the melting point of the modifier but substantially below the melting point of the semi-conductor. The modifier is not initially heated to the alloying temperature but rather is brought to a temperaure just high enough to melt the modifier element. When the modifier has reached the molten stage, vibratory energy, preferably including ultrasonic frequencies, is applied to the modifier after which the modifier is then heated to the desired alloying temperature. The modifier is then maintained at the alloying temperature for a period of time sufficient to dissolve a portion of the semi-conductor material into the molten modifier to form a junction comprising an alloy of the modifier and the semi-conductor. During this alloying period, vibration is again applied to the modifier. Finally, the device is cooled below the melting point of the modifier to permit the latter to solidify. This technique is subject to several variations; for example the application of vibration to the modifier may be either continuous or in discrete steps. Also, substantial advantages are retained by applying vibration only during the actual alloying step.

Figures 2, 7, 8:
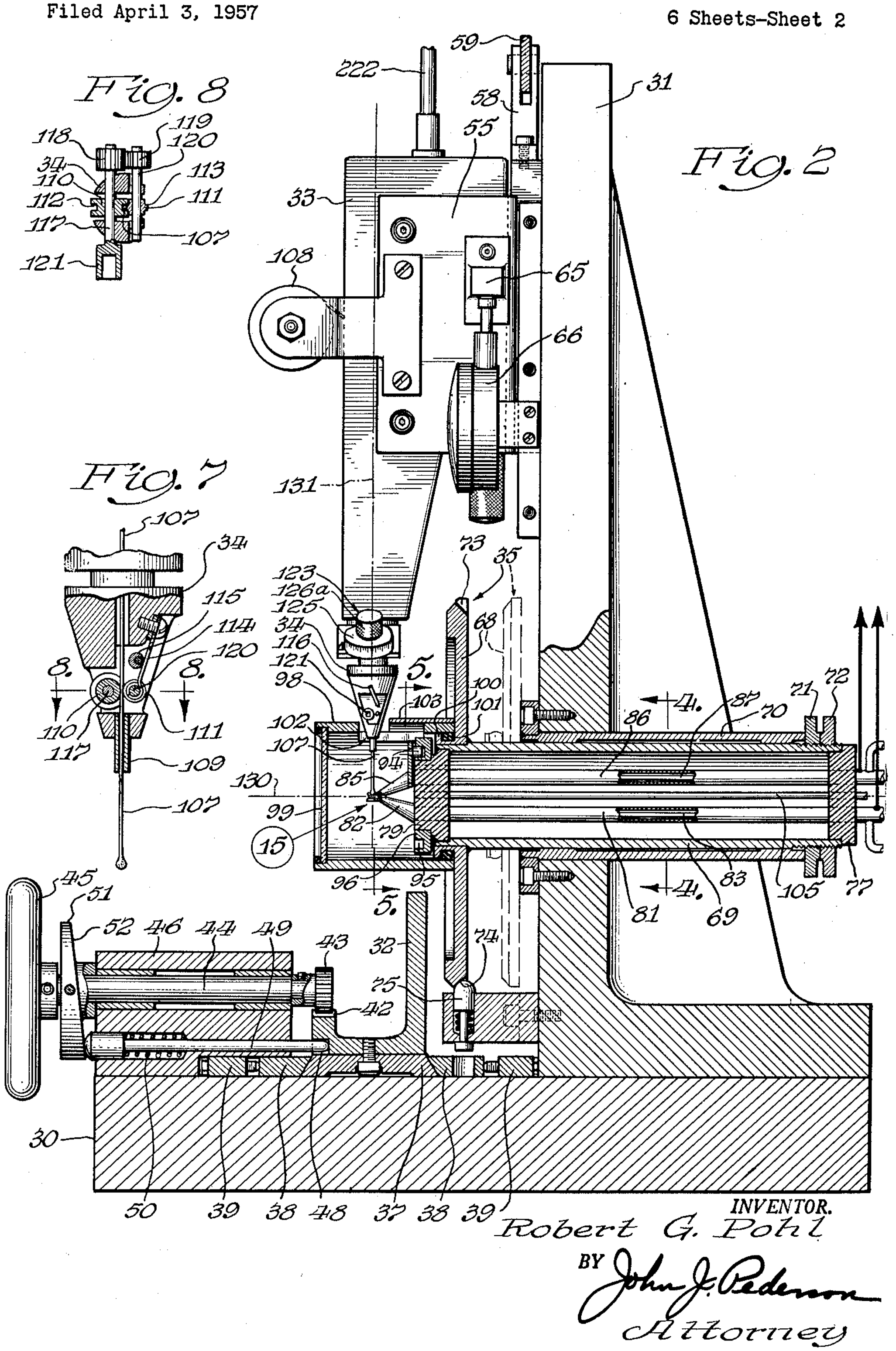
FIGURE 2 is a view, partially in cross-section, taken along line 2—2 in FIGURE 1 but with some of the parts in a different position and including a part not attached to the apparatus shown in FIGURE 1.
FIGURE 7 is a fragmentary cross-sectional view taken along line 7—7 in FIGURE 1.
FIGURE 8 is a fragmentary cross-sectional view taken along the line 8—8 in FIGURE 7.

FIGURES 1, 2 and 3 comprise overall views of apparatus constructed in accordance with the present invention and should be viewed together in order to most easily understand the basic movements of the different component parts of the assembly. The apparatus includes generally a horizontal base 30 from which rigidly projects an upright standard 31 and across which slides a station platform 32. Carried on standard 31 is a transducer unit 33 and a wire dispenser 34 cooperating with and attached thereto. Also carried by standard 31 is a rotatable head assembly 35 positioned below transducer 33 and just above platform 32.

Platform 32 is an elongated bar of upright J-shaped cross-section and secured at its bottom to slide member 37 which dovetails in a channel defined by guide rails 38. Guide rails 38 and associated tightening elements 39 are secured to base 30 by bolts 40.

The upwardly facing end surface of the short leg of platform 32 is cut with gear teeth 42 which cooperate with a spur gear 43 coupled by a shaft 44 to a hand wheel 45. Shaft 44 is journaled within a housing 46 rigid with base 30. Rotation of hand wheel 45 turns spur gear 43 in which drives platform 32 laterally across base 30.

The longer leg of platform 32 supports a plurality of upright process stations generally indicated respectively by the numerals 9, 10, 11, **11*b*, 12, 13 and 16, which numerals refer to those figures of the drawings which depict the individual stations in more detail and about which more will be said below. Suffice it for the present to say that, as hand wheel 45 is rotated, the individual stations are brought successively into position beneath dispenser 34 and directly in front of head assembly 35. Immediately beneath each station in the front surface of the shorter leg of platform 32 is a lateral recess 48. This recess receives a horizontal plunger 49 slidably disposed in housing 46 and biased by a spring 50 away from recess 48. Slidably mounted on shaft 44 is a collar 51 having an inner surface 52 lying in a plane tilted with respect to the vertical; the end of plunger 49 remote from recess 48 rides on surface 52. A handle 53 permits rotation of collar 51 to cam plunger 49 into and out of recess 48, whereby when a selected station has been positioned directly beneath dispenser 34, handle 53 may be moved to drive plunger 49 within the corresponding recess 48 thereby locking platform 32** and the selected processing station in a fixed position.

Transducer 33 is secured within a U-frame 55 which in turn is rigid with a slide 56 dovetailed in a channel defined by guides 57 secured to standard 31. Slide 56 is coupled by a link 58 to the center of a lever 59 pivotally connected at one end 60 to standard 31. Movement of lever 59 in a vertical direction correspondingly moves transducer 33 toward or away from platform 32 and its stations.

Projecting laterally from one side of frame 55 is a finger 62 which, upon downward movement of transducer 33, engages the end of a micrometer 64 affixed to standard 31. Accordingly, the lower limit of movement of transducer 33 and dispenser 34 attached thereto may be accurately pre-set.

Projecting from other side of frame 55 is another finger 65 which, upon downward movement of transducer 33, engages with and actuates a gauge-micrometer 66 affixed to standard 31. By reading the gauge, the operator is able to determine the exact position of transducer 33 and wire dispenser 34 with respect to a selected horizontal reference plane at positions above that limited by micrometer stop 64.

Head assembly 35 comprises a disc 68 collared upon the front end of a hollow cylinder 69 journaled in a sleeve 70 projecting rigidly through and behind standard 31 below the assembly carrying transducer 33. Cylinder 69 is longer than sleeve 70 and is threaded on its rearward extremity to receive a collar 71 and a locking nut 72; collar 71 engages the rearward end of sleeve 70 to limit movement of disc 68 away from standard 31 to the position illustrated in full lines in FIGURE 2. Alternatively, disc 68 may be pushed rearwardly to a position adjacent standard 31 as indicated in phantom in FIGURE 2. A pair of V-shaped notches 73 and 74 are cut at diametrically opposite points in the rim of disc 68 and cooperate with a spring biased detent 75, supported from standard 31, to hold disc 68 and the components rigid therewith at either of two rotational positions corresponding to the positions of the two notches.

A plug 77 seated within the rearward end of cylinder 69 is apertured to receive several conduits which extend therethrough toward the front end of cylinder 69 and about which more is said below. It will suffice for the present to note that these conduits are coupled to flexible tubing to permit at least a half turn of disc 68 in either direction; of course, rotating seals of any suitable variety may be employed thereby permitting unrestricted rotation of head assembly 35.

Figure 4:
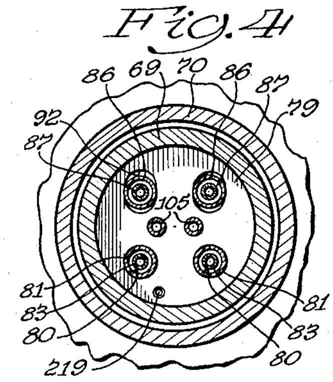
FIGURE 4 is a fragmentary cross-sectional view taken along the line 4—4 in FIGURE 2.

A plug 79 is seated within and across the front end of cylinder 69 and is shown in more detail in FIGURES 4, 5 and 6. In the lower half of plug 79 are a pair of horizontally spaced apertures 80 which snugly receive a pair of electrically conductive conduits 81 across the front ends of which a heating element 82 is electrically and mechanically joined. Coaxially within conduits 81 are conduits 83 which terminate a short distance back of heater element 82. Conduits 83 and 81 convey water or other suitable coolant toward and away from the joined end of heater element 82, thereby maintaining the latter when de-energized at a constant ambient temperature and, immediately after de-energization of elements 82, effecting a more rapid cooling of the latter. As indicated schematically in FIGURE 2, electrical connections are made to conduits 81 and therethrough to heater element 82.

A second heater element 85, similar to heater 82, projects outwardly from the top half of plug 79 and is electrically and mechanically joined to the ends of conduits 86 coaxially enclosing conduits 87. As with conduits 81, conduits 86 serve as electrical connections to heater element 85 and together with conduits 87 conduct water for cooling the associated heater element.

Heater elements 82 and 85 are generally V-shaped, the free ends of the V being connected to the conduit ends. The two heater elements bend toward one another and the apex portions 89 of each are channel shaped so that, when mated complementarily together, a recess 90 is formed into which a portion of the device under manufacture is inserted, more about this appearing below; apex portions 89 thus constitute a pair of jaws. In order to permit insertion of the device under treatment into the jaws for subsequent clamping thereby, conduits 86 extend through vertically elongated apertures 92 in plug 79. To control vertical movement of conduits 86 and hence of heater element 85 relative to heater element 82 for opening and closing the jaws, a follower plate 92 is affixed on the forward ends of conduits 86 and carries a cam follower 94 which rides in a circular channel 95 eccentric with respect to the axis of rotation of head assembly 35. Eccentric channel 95 is cut into the front surface of a ring 96 rotatable on the outward end portion of plug 79. Thus, rotation of ring 96 opens and closes the jaws formed by apex portions 89.

In FIGURE 2, platform 32 has been cranked by means of handle 45 to the right end of the assembly as viewed in FIGURE 1 so that none of the stations supported by platform 32 are visible nor are directly beneath transducer 33. This view illustrates one step of the overall procedure wherein a cylindrical housing 98, closed across its outer end by a transparent disc 99, is pressed onto an O-ring 101 encircling the hub 100 of disc 68. A slot 102 is cut through the top portion of housing 98 to permit entry of the lower end of dispenser 34; a shield 103 is affixed over slot 102 to minimize the size of the opening to that just sufficient to permit entry of the lower end of the dispenser. A pair of conduits 105 extend from the housing to the rear through plugs 77 and 79 to convey a reducing atmosphere into and out of housing 98 during this step of the procedure.

Dispenser 34 pulls wire 107 from a spool 108, affixed to U-frame 55, down through transducer 33 and directs the wire vertically downwardly through and out of sleeve 109 (FIGURE 7) pressed into the lower end of the dispenser. Transducer 33 is by itself a conventional ultrasonic soldering iron, although its use in the present apparatus is not one of soldering but only for the purpose of applying vibratory energy to wire 107. A typical ultrasonic soldering gun suitable for use in the present apparatus is Model No. E 7587 M sold by Mullard Overseas Ltd. of London, England.

Dispenser 34 is illustrated in detail in FIGURES 7 and 8, which should be viewed together with FIGURES 1 and 2. Wire 107 runs centrally through the dispenser, being pulled by rotation of stainless steel rollers 110 and 111; wire 107 rides in a circumferential slot 112 in roller 110, the wire being pressed into the slot by a circumferential ridge 113 on roller 111 seated within slot 112. Roller 111 is biased against roller 110 by a flat spring 114 secured to the body of the dispenser. An eccentric cam 115 disposed against the inner surface of spring 114 may be rotated by movement of lever 116 to permit movement of rollers 110 and 111 apart for initially threading the wire through the dispenser. Roller 110 is secured onto a shaft 117 having at one end a spur gear 118 cooperating with a mating spur gear 119 on one end of a shaft 120 carrying roller 111. Thus, rotation of shaft 117 in a clockwise direction as viewed in FIGURE 7 effects movement of wire 107 downwardly. Rigid on the end of shaft 117 is a coupling 121 which mates with a square shank 122 of a screw gauge 123 pivotally secured by an arm 124 to the body of the dispenser above shaft 117. As shown in FIGURES 1 and 2 in full lines, screw gauge 123 is swung upwardly out of engagement with shaft 117. When it is desired to advance wire 107, arm 124 is swung downwardly to position screw gauge 123 as indicated in phantom in FIGURE 1, thereupon engaging shank 122 with coupling 121. A calibrated dial 125 cooperates with an index 126 to permit accurate indication of the amount the wire is advanced upon grasping and turning the knob 126*a* affixed to and a part of screw gauge 123.

It will be observed that the apparatus thus far described has three principal operational axes. A first such axis constitutes the axis of rotation of head assembly 35 and has been indicated in FIGURES 2 and 3 by the numeral 130. A second principal axis is that along which wire 107 is fed and preferably is normal to and intersects axis 130 but at least intersects recess 90 and consequently intersects the portion of the device inserted therein; this vertical axis has been indicated by the numeral 131 in FIGURES 1 and 2. The third principal operative axis is that along which the different processing stations are moved. This axis has been indicated in FIGURES 1 and 3 by the numeral 132 and preferably is normal to and intersects each of axes 130 and 131. Thus, the three axes define a tri-coordinate system and, as will be shown, practically all steps of the inventive process are carried out at the origin of these three axes; that is, the place at which the fabrication is being performed at any given instant is at the position where these three axes meet. Consequently, recesses 48 are so disposed on platform 32 as to lock the corresponding station then in use in a position at the common origin of the three axes. Similarly, head assembly 35 when moved to its forward or outward position disposes the jaws formed by apex portions 89 at this common origin. As is expalined below, only one principal step in the overall operation is not performed at this one spatial point. This is not to say that the particular operation being accomplished at any given instant necessarily takes place exactly at the intersection of the three axes but is to say that the apparatus generally is centered at the common origin or at least one station is positioned immediately around the common origin whereas other stations, for example, are spaced considerably away therefrom.

Preparatory to beginning the manufacturing procedure, head assembly 35 is pushed to its rearward position and handle 53 is moved so that it points to the left in FIGURE 1, thereby releasing plunger 49. Hand wheel 45 is then rotated in a clockwise direction to move platform 32 to the left until station No. 9 is in position at the origin defined by axes 130, 131 and 132; handle 53 is then moved back to the position shown in FIGURES 1 and 2 to urge plunger 49 into the recess 48 immediately beneath station 9 thereby locking the latter in position.

The details of the apparatus at station 9 will best be understood by reference to FIGURES 9, 9*a* and 9*b*. In the operating position, the apparatus of station 9 is positioned directly beneath dispenser 34; by rotation of screw gauge 123 engaged with coupling 121, wire 107 is advanced to project from the lower end of sleeve 109. Co-linear with and beneath wire 107 and sleeve 109 is a barrel 135 slidable in a bearing-block 136 rigid with the longer leg of platform 32; a C-ring 137 affixed around barrel 135 normally rests on the upper surface of bearing-block 136 in which position the upper end 138 of barrel 135 is spaced beneath the free end of wire 107. Threaded on barrel 135 below bearing-block 136 is a nut 139 the upper surface 140 of which limits upward movement of barrel 135 to a position at which end 138 is almost touching dispenser 34 and at which sleeve 109 is disposed a short distance within the bore 141 of barrel 135; bore 141 is of a diameter to snugly receive sleeve 109. Within bore 141 is a piston 142 normally urged by a spring 144, compressed between the lower end surface of nut 139 and a knurled knob 145 rigid on the lower end of piston 142, to a position in bore 141 spaced below the free end of wire 107 when barrel 135 is raised to its upper position whereat sleeve 109 projects within bore 141. As shown in the drawings, the lower portion of bore 141 and the corresponding portion of piston 142 are enlarged in order to give more rigidity to the piston since, in practice, sleeve 109 and the corresponding portion of upper bore 141 are of a very small diameter.

The apparatus of station 9 is utilized as a step of the overall procedure to form a loop 147 in the end portion of wire 107 and lying in a plane transverse of the wire, as shown in FIGURE 9*c*. To form the loop, barrel 135 is raised to its upper position at which sleeve 109 projects downwardly within bore 141 a short distance; wire 107 has previously been advanced to project beyond the lower end of sleeve 109 by a distance corresponding to the length of wire in loop 147. Piston 142 is then raised upwardly against the exposed end portion of wire 107 whereupon the latter is deformed into loop 147. In a typical example, wire 107 is .0020″ diameter stainless steel, the operative upper portion of bore 141 is 0.015″ in diameter, and wire 107 projects below sleeve 109 about 0.04″. The resultant loop 147 has a diameter of approximately 0.015″.

For the next procedural step, handle 53 and hand wheel 45 are operated to move station No. 10 into the operating position on axis 131. Wire 107 having loop 147 formed thereon is still suspended from dispenser 34. The apparatus of station 10 is illustrated in detail in FIGURE 10 and comprises a flux bath in which the lower end portion, loop 147, of wire 107 is immersed to a predetermined depth. The flux bath of FIGURE 10 is unique in that the same level of liquid in the bath is always presented to wire 107 even after a number of repetitions of this step of the procedure; this is achieved without the need for an auxiliary reservoir or an associated float-control or the like as is conventionally employed in such a bath. To this end, the flux bath of station 10 comprises a flexible upright cup 150, preferably of plastic, supported by an O-ring 151*a* from the lip of and within a larger rigid cup 151 mounted on a pedestal 152 secured to platform 32. Flexible cup 150 contains a quantity of liquid flux 153 of predetermined viscosity. Disposed beneath cup 150 is a piston 154 vertically slidable through the bottom of rigid cup 151; the upper end surface 155 of piston 154 is also cup-shaped. A collar 156 locked on piston 154 below rigid cup 151 limits upward movement of the piston by abutment with the undersurface of cup 151.

In use, flexible cup 150 is initially filled to a depth such that, with piston 151 raised to its upper position as illustrated in FIGURE 10 in full lines, the surface of the liquid in cup 150 is below the rim of the innermost cup 157 formed by the bottom portion of cup 150 lying against piston end surface 155. Piston 154 is then lowered to its bottom position as indicated in phantom in FIGURE 10. Upon subsequently raising piston 154, inner cup 157 is formed almost immediately whereupon it is filled to its brim as it is raised on upwardly to the final position above the portion of the liquid external to it. Wire 107 is then advanced a predetermined amount to dispose loop 147 within the reservoir formed by inner cup 157; upon subsequent withdrawal of wire 107 from cup 157, a quantity of the flux constituting liquid 153 clings to loop 147 by virtue of surface tension forces. Before this step of the process is repeated, piston 154 is again lowered and then raised to replenish and completely refill cup 157 to replace the flux which was carried away on loop 147 in the previous step. In the present embodiment, liquid 153 is a stainless steel flux identified commercially as No. 228 manufactured by Division Lead Company.

After the fluxing of loop 147 with flux 153, handle 53 and hand wheel 45 are again operated to position station 11 along axis 131. The apparatus at station 11 comprises a very simple punch for producing from a sheet of modifier material a pellet thereof which is picked up by loop 147 for operation thereon in the next step of the process. Station 11 is best illustrated in FIGURES 11 and 11*a*; FIGURE 11*b* is of station **11*b*, and is also useful in explaining the operation of station 11*a*, since the two stations are identical except for certain dimensions. Station 11 comprises a table 160 secured to platform 32 and to the top of which is secured a plate 161. A hole 162 extends vertically through table 160 and is aligned with a smaller hole 163 through plate 161. The top surface of table 160 is milled from the front edge thereof evenly over an area including hole 162 and terminating short of the rear surface of the table adjacent platform 32 so that the top surface of table 160 and plate 161 define a slot 164 into which a sheet 165 of modifier material may be inserted. A bracket 166 projects rigidly forward of platform 32 below table 160 and includes an integral post 167 projecting upwardly from the outer end portion of the bracket. Pivoted at its center on post 167 to rock about a horizontal axis is a lever 168 having one end 169 disposed beneath hole 162 and defining a convex cam surface facing the hole. Resting on this cam surface, lever 168 in turn resting in a normal position on a boss 170 projecting upwardly from the center portion of bracket 166, is a piston 171 slidably disposed in hole 162. Projecting coaxially from an integral with the upper end of piston 171 is a punch rod 172 of a diameter appoximating that of hole 163 in plate 161**.

When the outer end of lever 168 is pressed downwardly, punch 172 is driven upwardly through sheet 165 from its lower position as illustrated in FIGURE 11 to its upper position as illustrated in FIGURE 11*a*. Thereupon, a pellet 174 punched from sheet 165 rests on the upper end surface of punch rod 172 in direct alignment beneath loop 147 suspended from dispenser 34. Wire 107 is then advanced to bring loop 147 against pellet 174; alternatively, punch rod 172 may be of sufficient length to move the pellet against the loop. Upon subsequently withdrawing wire 107 or lowering punch 172, pellet 174 clings to loop 147 by virtue of the surface tension forces in the flux previously deposited on and clinging to the loop. In the present embodiment, the pellet material is of indium, sheet 165 is 0.015″ thick and punch is 0.016″ in diameter.

While the next immediate step does not include station **11*b*, this station being utilized later in a substantial repetition of the overall process, it is convenient to note at this time that the apparatus at station 11*b* is identical with that at station 11 except for certain dimensions. In this instance, punch 172*a* has a diameter of 0.013″, sheet 165*a*, of indium, is 0.005″ thick. Pellet 174*a*, is thus of a slightly smaller diameter than pellet 174**; in FIGURE 11*b*, the apparatus is shown in a position after the punching operation with the pellet clinging to loop 147.

To carry out the next step of the process, station 12 is moved into position along axis 131. The apparatus of this station is shown in detail in FIGURE 12 and comprises a tube 180, of porcelain or the like, vertically disposed rigidly through a pedestal 181 secured to platform 32. Within tube 180 is a heater coil 182 electrically connected by wires 183 to a microswitch 184 (FIGURE 3). Microswitch 184 is positioned to be actuated by a lug 185 affixed to rearward tightening element 39 in a position such that the microswitch is actuated to energize coil 182 when station 12 is disposed at the principal operating position along axis 131.

Loop 147, from which is suspended pellet 174, is then lowered, by advancing wire 107 or lowering dispenser 34, within the upper portion of tube 180, whereupon pellet 174 is melted onto the loop and forms thereon a droplet 186. Preferably, ultrasonic energy is applied to transducer 33 to vibrate loop 147 during the melting of pellet 174; this aids in the achievement of better alloying during a subsequent step to be described. While the exact reason for such better alloying is not known, it may be that certain impurities or oxides are driven by the vibration to surface of droplet 186 from where they are subsequently removed during a succeeding rinsing operation. The temperature to which the pellet and loop are heated does not appear to be critical and in the present embodiment is about 355° C., which is approximately 200° C. above the melting point of the indium pellet.

After the formation of droplet 186 at station 12, station 13 is moved into position beneath the now-solidified droplet whereupon the latter is successively immersed in a plurality of rinse-baths. With the apparatus at station 13, this multiple rinsing is accomplished without the necessity of moving platform 32 between each rinsing operation; the apparatus of station 13 is illustrated in detail in FIGURE 13 whch should be viewed together with FIGURE 1, the latter showing station 13 to one side of the operating position. This apparatus comprises a holder 187 rotatable about a vertical axis 199 through its center and supported for vertical movement within a limited distance. Holder 187 is affixed to the upper end of a spindle 188 extending through vertically aligned apertures individually in two legs 189 and 190 of a U-shaped bracket 191 secured to platform 32. Spaced collars 192 and 193 on the holder respectively above and below upper leg 189 limit movement of holder 187 between its upper and lower positions. Four holes are drilled in the top surface of holder 187 to receive a corresponding number of cups 195, 196, 197 and 198 spaced equally apart circumferentially around and equally from the vertical axis of rotation 199 of holder 187. Holder 187 is positioned with respect to platform 32 and the recess 48 corresponding to station 13 so that, when station 13 is positioned generally along principal axis 131, axis 199 is spaced from axis 131 by a distance equal to the spacing between axis 199 and the median circle joining the individual vertical axes of cups 195–198.

Consequently, with station 13 disposed in the operating position along axis 131, rotation of holder 187 successively aligns each of cups 195–198 with vertical axis 131 and hence with wire 107 and droplet 186 which are disposed along axis 131. Thus, by successively lowering droplet 186 through advance of wire 107 or lowering of dispenser 34, and between each such reciprocation rotating holder 187 a quarter-turn, droplet 186 is successively immersed into liquids contained in each of cups 195–198. In the preferred embodiment, cup 195 contains a weak acid such as dilute hydrochloric acid for removing oxides from the indium. Cup 196 contains water for removing the acid, while cup 197 contains acetone to remove the water. Finally, cup 198 contains an alloy flux, preferably that known commercially as No. 521 manufactured by Division Lead Company.

During the successive rinsing steps at station 13, it is preferable that ultrasonic energy be applied to transducer 33 so that droplet 186 is vibrated while it is immersed in each of the individual rinse baths. Such vibration assists in removal of oxides and other deposits adhering to the surface of the droplet.

After the multiple rinsing at station 13, platform 32 is moved all of the way to the right (FIGURE 1) so as to clear the area in the vicinity of heater elements 82 and 85 of obstructions; this represents station 15 and corresponds to the position of platform 32 as shown in FIGURE 2. Head assembly 35 is at this time pulled outwardly to its forward position. At or before this time, a separate sub-assembly operation takes place preparatory to the operations at station 15 which comprise the alloying step. This separate sub-assembly operation is illustrated in FIGURES 14 and 14*a* wherein there is shown a very simple but extremely efficient loading block 200 to be used for inserting a semi-conductor wafer 201 of germanium or the like between the legs 202 and 203 of a U-shaped base tab 204. Base tab 204 is more completely described and claimed in a copending application of Robert G. Pohl, entitled Semi-Conductor Apparatus, filed January 30, 1957, Serial No. 637,150, and assigned to the same assignee as the present invention. Base tab 204 includes a pair of coaxial apertures 205 and 206 individually disposed in legs 202 and 203, respectively; legs 202 and 203 are spaced apart to snugly receive wafer 201. In the present embodiment, legs 202 and 203, of nickel, have an individual thickness of .010" and are coated internally with a layer of tin 0.0005" thick which later solders base tab 204 to wafer 201. Wafer 201 consists of 3 ohm-centimeter n-type germanium and is 0.003" thick and 0.075" square.

A recess 208 is milled into the top surface of block 200 to a depth at least greater than the thickness of leg 203 of base tab 204 and preferably is several times that thickness; recess 208 has a length and width sufficient to receive the flat side of the base tab which, in the present example is approximately 0.075" wide and 0.105" long. A channel 209 is also milled into the top surface of block 200 and extends from one edge of recess 208 preferably to the edge of block 200. Channel 209 has a depth substantially equal to the depth of the recess less the thickness of leg 203; the channel is of a length sufficient to accommodate the wafer in a position in the channel completely external of recess 208.

In order to load wafer 201 into base tab 204, the base tab is first placed into recess 208 with its open end facing the channel. Wafer 201 is then placed in the channel and gently pushed on its outer end by the tip of a finger 210 into position between the legs of the base tab until it is seated entirely therewithin.

After the loading of wafer 201 into base tab 204, the base tab preferably is dipped in a pot of flux, such as that commercially known as No. 521 manufactured by Division Lead Company. This may be achieved by picking up the base tab with a pair of tweezers and dipping it in cup 198 of station 13. Any excess flux on the surface of the base tab may be removed by blotting the tab with a paper tissue so as to avoid fouling heater elements 82 and 85 in carrying out the next step. It has been found that the application of the flux both to droplet 186 as a final step at station 13 and to base tab 204 before insertion of the latter into recess 90 aids in proper formation of the alloy junction.

Base tab 204, loaded with wafer 201 and coated with the flux, is then inserted into recess 90 at the end of heating elements 82 and 85. It will be recalled that ring 96 is rotated to spread the heating elements apart and thereby expand the size of recess 90; the loaded base tab is then seated within the recess after which ring 96 is turned to clamp the heating elements together whereupon, with head assembly 35 in its forward position, the base tab is held securely in a position centered precisely at the origin of axis 130, 131 and 132; recess 90 is accurately formed to correspond with the size of base tab 204 so as to locate the latter accurately in position.

After seating and clamping the base tab within recess 90, housing 98 (FIGURE 2) is pressed onto O-ring 101. Transducer 33 is lowered by means of lever arm 59 to position dispenser 34 with its nose projecting slightly through opening 102 in the housing. Wire 107 is then advanced, by means of screw gauge 123, to bring droplet 186 against wafer 201 through aperture 205 in the base tab, care being taken not to apply excessive force so as to put a kink in wire 107. To aid in this operation, disc 99 closing the end of the housing is transparent and the positioning of droplet 186 against wafer 201 is observed by the operator through a stereoscopic microscope (not shown) suspended in front of housing 98.

Conditions are at this point in order for actually forming the alloy junction between droplet 186 and wafer 201. Before more fully describing that operation, reference should be had to FIGURE 19 which illustrates schematically a control system for the apparatus of the present invention. Heater elements 85 and 82 are coupled in parallel (by way of conduits 81 and 86) to the secondary winding of a filament transformer 215. The amount of current supplied to the heater elements from transformer 215 is controlled by a saturable reactor 216 in turn regulated by a temperature controller 217. In order to precisely govern the temperature of heating elements 82 and 85, a thermo-couple 218, spot welded to heater element 82, is coupled by leads 219 passing through plugs 79 and 77 to the temperature controller. Thermo-couple 218 together with the temperature controller and saturable reactor constitute a servo-system capable of exercising a precise degree of control over the temperature of the heating elements.

In order to achieve high speed fabrication of semiconductor devices with the present apparatus, it is necessary to control the alloying temperature accurately as a function of time in a precisely reproducible manner. To supply a fixed amount of power from a regulated supply for a given length of time is inadequate since the ambient conditions of the entire system may change. Hence, the servo temperature control system must be both accurate and rapid in response in order to achieve maximum productivity from the apparatus. Additional speed is obtained with the apparatus of the present invention by constructing heater elements 82 and 85 of a material having a low thermal mass, such as Nichrome. Thermocouple 218 is also of low mass material, preferably of 28 gauge Chromel-Alumel. Also, as was previously noted, heater elements 85 and 82 are water cooled in order to, upon de-energization, cool them rapidly to an ambient temperature.

Also included in the control system is a program controller 219, which may be combined with the temperature controller, that programs the operation of temperature controller 217, a system 220 for supplying a reducing gas through conduits 105 into housing 98, and an ultrasonic generator 221 coupled by a coaxial cable 222 to transducer unit 33. A regulated alternating-current power supply 223 supplies energization for all of the other units of the control system and for heater coil 182 at station 12.

In the present embodiment, transformer 215 is capable of supplying 1500 watts to heating elements 82 and 85. The program controller and temperature controller are of a conventional variety; a suitable program-type temperature controller is Model JSG-2 manufactured by West Instrument Corporation, the control cams of which are suitably modified to provide the particular temperature cycle desired for the present apparatus. The gas introduced into housing 98 during alloying comprises a mixture of nitrogen and hydrogen; approximately two liters of gas per minute are utilized. The gas is first passed through a silica dehumidifier, a palladium catalytic deoxident, and then through concentrated sulfuric acid to remove water vapor. In a typical instance, the gas comprises 50% hydrogen and 50% nitrogen. It has been found that decreasing the proportion of hydrogen reduces the size of the resultant alloy junction; this phenomenon is thought to be due to the occurrence of a greater amount of oxidation of the liquid indium with a decrease in the hydrogen gas content whereby wetting of the wafer surface by the indium is reduced. Ultrasonic generator 221 is an entirely conventional power oscillator and supplies approximately 50 watts of power to transducer 33. The oscillator output preferably includes both an ultrasonic frequency component, of perhaps 20 kcs., and a low frequency component of a few hundred cycles per second. A more detailed discussion of the application of vibratory energy during formation of the alloy junction is given in the aforementioned copending application Serial No. 576,409.

The preferred cycle of operation during the alloying step is illustrated by the curve in FIGURE 20 in which time is plotted along the abscissa and the temperature is plotted along the ordinate in degrees centigrade, the origin being at the lower right-hand corner of the figure; instead of being straight as in a conventional plot, the ordinate is convex to the right corresponding to the ordinates on a chart-type temperature recorder, from which FIGURE 20 was taken, wherein the recording pen is pivoted approximately at the center of the strip of recording paper and thus describes an arc on the paper with changes in the ordinate value. Point A represents the beginning of the cycle at which time gas supply system 220 initiates the flow of reducing gas into housing 98. Heater elements 82 and 85 are first energized at point B from which the temperature rises rapidly to point C, at which droplet 186 melts, and continues to point D at which point the temperature levels off for a short instant and ultrasonic transducer 33 is energized. Subsequently, the temperature is again caused to rise by the application of more energy to heater elements 82 and 85 until point E is reached at about 600° C. whereupon transducer 33 is de-energized. A short time later, at point F, heater elements 82 and 85 are de-energized after which the latter are cooled until point G is reached whereupon the cycle is completed, the gas supply is turned off, and housing 98 is removed. It will be observed that the entire alloying cycle takes only approximately 30 seconds, which sharply contrasts with prior known oven-type alloy-junction forming procedures. In some instances, it may be desirable, during the interval between points C and D just after the indium has melted, to advance wire 107 slightly in order to dispose loop 147 closer to wafer 201.

It must be emphasized that FIGURE 20 is merely illustrative of one procedure which may be carried out with the apparatus of the present invention. Substantially all of the parameters which have thus far been discussed affect the characteristics of the finished junction and the different parameters may be varied as desired to achieve whatever specific character of device is desired in the individual case. For example, the size of the pellet from which the junction is formed is an important consideration in the gain, power capacity, and frequency response of the transistor. Likewise, the size of the loop 147 has at least some control over the amount which the modifier spreads during the alloying operation; generally the junction size will be as large or larger than the loop size. For the example thus far described, the junction will be about 0.020″ in diameter. Moreover, higher temperatures and longer temperature cycles generally yield junctions of larger area. The interplay of these different variables enables the operator to control the resultant junction size in a selectible manner, and the precise reproducibility obtainable with the apparatus of the present invention permits that selected value to be maintained in successive units during high volume production.

After completion of the alloying schedule just discussed, the junction will appear as illustrated in FIGURE 15 in which base tab 204 is shown still seated within recess 90 formed by the apex portions 89 of the heater elements. Droplet 186 has been alloy-joined to wafer 201, wire 107 projecting upwardly from the junction and loop 147 being disposed within the modifier material in good mechanical and electrical contact therewith.

After completion of the alloying operation and the removal of housing 98, platform 32 is moved to dispose station 16 at the operating position along axis 131. A portion of the apparatus of station 16 is illustrated in detail in FIGURE 16 and comprises an upright forked yoke 230 slidably mounted for movement in the direction of axis 130. For this purpose, a square shaft **230*a*, projects horizontally forward from an upright plate 230*b* affixed to platform 32 (FIGURE 1); yoke 230 is carried on shaft 230*a* which lies in a mating aperture 230*c* through the lower portion of the yoke. Initially, yoke 230 is pulled forward in front of axis 132 to permit movement of station 16** into the operating position.

Coaxial apertures 231 are individually disposed in each of the two leg portions 232 of yoke 230. Individually disposed in apertures 231 are a pair of cutter blades 233 slidable in the apertures along the axes thereof and having facing cutting edges 234 aligned for mutual engagement upon movement of blades 233 together. Transverse slots 235 extending individually through each of the cutter blades ride on pins 236 disposed rigidly across apertures 231. Knurled knobs 238 are affixed on the portions of cutter blades 233 external of leg portions 232 and include inwardly projecting bosses 239. Cutter blades 233 normally are urged apart by means of springs 240, compressed between knobs 238 and leg portions 232, to a position limited by engagement of pins 236 with the inner ends of slots 235. Movement of cutter blades 233 together is limited by abutment of bosses 239 against leg portions 232 at which position cutting edges 234 meet precisely in a plane bisecting the yoke and including center line 241 between leg portions 232; the recess 48 corresponding to station 16 is oriented so that center line 241 coincides with principal vertical axis 131 of the apparatus and hence with wire 107.

Accordingly, after station 16 is moved into position beneath dispenser 34, yoke 230 is pushed rearwardly along axis 130 whereupon wire 107 is centered between cutting edges 234 and along the principal axis 131. Knobs 238 are both pressed together whereupon wire 107 is severed without lateral flexure thereof. Base tab 204 is supported in recess 90 during the severing operation whereby a clean cut through the wire is obtained without kinking of the wire or exerting sideward stress on the alloyed junction.

This completes a half cycle of the total process which includes the formation of an alloy junction on both sides of wafer 201. A substantially identical procedure is utilized subsequently in the formation of the second junction. For the usual p-n-p (or n-p-n as the case may be) transistor, it is highly desirable in order to obtain proper operating characteristics of the completed device that the two junctions be precisely positioned diametrically opposite one another. Such precise positioning is readily obtained with the present apparatus simply by rotating head assembly 35 through 180 degrees whereupon detent 75 secures disc 68 in a position whereat wafer 201 is exactly inverted and wire 107, corresponding to the center of the first-formed junction again lies along the principal vertical axis 131. For repeating the other steps of the process preparatory to forming the second junction, however, head assembly 35 is positioned rearwardly to its out-of-the-way position as shown in phantom in FIGURE 2.

The entire process is then repeated beginning with the formation of a loop by positioning station 9 beneath dispenser 34. Station 10 is then moved into position whereupon the loop is coated with flux. The only principal difference between the procedure utilized in forming the first junction differing from that in forming the second now appears in that station 11*b* follows station 10 in place of station 11 which was used earlier. In the present instance, the only difference in the punch of station 11*b* over that of the punch in FIGURES 11 and 11*a* lies in the thickness of the modifier material and the diameter of the punched pellet. In the present example, sheet 165*a* of modifier material is 0.005" thick, while punch 172*a* is 0.013" in diameter. Otherwise the procedure previously described with respect to station 11 is followed.

Next, the pellet is melted onto the loop at station 12 after which the thereformed droplet is successively rinsed at station 13. Platform 32 is then moved to one side and head assembly 35 is moved forwardly into the alloying position. Once again the droplet is brought carefully into contact with wafer 201, but this time on the side thereof opposite the previously formed junction. The same alloying procedure as described heretofore is then repeated as a result of which a second junction is formed as indicated in FIGURE 15*a*. In this case, the second junction is smaller in diameter than that of the first due to the decreased diameter of the pellet utilized. Finally, station 16 is brought into position, and the cutter assembly is once again brought into position whereupon wire 107*a* terminating in the second junction is severed.

This completes the formation of the device which now preferably is cleaned and then encapsulated. The preferred cleaning technique includes immersion of the entire device in a chemical etchant while subjecting the same to electrolytic action and ultrasonic vibration; a more detailed description of this method of final treatment is given in the copending application of Robert G. Pohl, entitled Method of Treating Semi-Conductor Devices, Serial No. 644,389, filed March 6, 1957, now Patent No. 2,861,932 issued Nov. 25, 1958 and assigned to the same assignee as the present invention.

The semi-conductor device in the form in which it appears upon completion of the entire procedure utilizing the apparatus of the present invention is illustrated in FIGURES 17 and 18. FIGURE 18 shows base tab 204 with wafer 201 disposed therein and joined thereto by the previously mentioned tin coating 245 which, as an incidental result of the alloying operation, establishes a good electrical bond between the base tab and the wafer. Base tab 204 securely cradles the wafer providing excellent mechanical strength which is highly desirable because of the brittleness of semi-conductor materials such as germanium. As a consequence, this permits the use of thinner wafers without excessive breakage, thinner wafers assisting in obtaining superior high frequency response.

It will be apparent that, although the apparatus is described in terms of manually controlled operation of the several processing stations, the apparatus described is readily adaptable to complete mechanization and automation. There are involved only the simplest of mechanical movements which require only rotation or reciprocation during operation. The extremely fast alloying cycle coupled with the rapidity with which the operation at each individual station may be performed leads to a production rate never before approached, particularly as compared with the conventional oven-type alloying apparatus. The simplicity of all the various movements and actions also leads to the maintenance of mechanical precision by which there is achieved a reproducibility of result of a degree rendering excellent economical performance. The compactness of the assembly minimizes space requirements as well as permitting a single operator to perform all operations necessary. With apparatus of the type described in the present embodiment, a single operator can turn out completed devices at the rate of approximately one per minute; for some types of semi-conductor devices, this volume per unit of time may be considerably increased. A number of factors have been shown to enter into and directly affect the excellent over-all results obtainable with the present apparatus. Certain of the general principles of the present invention, such as the arrangement of the operation along three principal axes, have application with perhaps other forms of the detailed apparatus at certain of the processing stations. On the other hand, each of the sub-combination assemblies at the various processing stations co-operates with the overall assembly to give a final result having all of the outlined advantageous features.

While a particular embodiment of the present invention has been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. Semi-conductor-device manufacturing apparatus comprising: a base; a plurality of processing stations for respectively performing sequential operations in the manufacture of said device; a standard rigid with respect to said base; means, supported by said standard, rotatable about a first predetermined axis and movable therealong between first and second positions for holding and applying heat to a body of semi-conductive material; means supported by said standard for feeding a wire along a second predetermined axis intersecting said body held by said rotatable means at said second position; and means on said base for moving said process stations along a predetermined path to successively dispose individual different ones of said stations at said second position intersected by said second predetermined axis.

2. Apparatus as defined in claim 1 which includes means for temporarily locking said stations individually at said second position.

3. Apparatus as defined in claim 1 in which said rotatable means comprises: a pair of heater elements projecting from a supporting head outwardly on opposite sides of said first predetermined axis and individually having opposing recesses, laterally centered with respect to said first predetermined axis, together defining a seat for said body; and means for urging said heater elements together to clamp said body in said seat in a position centered on said first predetermined axis.

4. Apparatus for forming an alloy-junction on a body of semi-conductor material comprising: a supporting head; means for mounting said head to rotate about and move along a predetermined axis; a pair of heater elements projecting from said head outwardly on opposite sides of said axis and individually having opposing recesses, laterally centered with respect to said axis, together defining a seat for said body; and means for urging said heater elements together to clamp said body in said seat in a position centered on said predetermined axis.

5. Semi-conductor-device manufacturing apparatus comprising: a base; a standard rigid with respect to said base; means, supported by said standard, rotatable about a first predetermined axis and movable therealong between first and second positions for holding and applying heat to a body of semi-conductive material; means supported by said standard for feeding a wire along a second predetermined axis normal to said first predetermined axis at said second position; and means mounted on said base for moving a plurality of process stations along a predetermined path normal to said first and second predetermined axes to successively dispose individual different ones of said stations at said second position.

6. Semi-conductor-device manufacturing apparatus comprising: a base; a standard rigid with respect to said base; means, supported by said standard, rotatable about a first predetermined axis and movable therealong between said first and second positions for holding a body of semi-conductive material and for applying heat thereto; means supported by said standard for feeding a wire along a second predetermined axis normal to and intersecting said first predetermined axis at said second position; and means mounted on said base for moving a plurality of process stations along a predetermined path to successively dispose individual different ones of said stations at said second position intersected by said second predetermined axis.

7. Semi-conductor-device manufacturing apparatus comprising: a base; a standard rigid with respect to said base; means, supported by said standard, rotatable about a first predetermined axis and movable therealong between first and second positions for holding and applying heat to a body of semi-conductive material; means, including an ultra-sonic transducer, supported by said standard for feeding a wire along a second predetermined axis intersecting said body held by said rotatable means at said second position and for applying vibratory energy to the wire; and means mounted on said base for moving a plurality of process stations along a predetermined path to successively dispose individual different ones of said stations at said second position intersected by said second predetermined axis.

8. Apparatus for manufacturing a semi-conductor device comprising: means for deforming one end portion of a straight wire member into a loop lying in a plane transverse of the wire member; means for applying a liquid flux to said loop; means for heating said loop and a pellet suspended therefrom by surface tension forces in said flux to melt said pellet in situ to form a droplet of the pellet material on said loop; a base; a standard rigid with respect to said base; means supported by said standard for applying ultrasonic energy to said loop and said modifier material during the formation of said droplet; means for rinsing said droplet to remove impurities from the surfaces thereof; means supported by said standard, including a head rotatable about a first predetermined axis and movable therealong between first and second positions, for holding a wafer of semi-conductive material means for applying a semi-conductor-wetting flux to at least one of said semi-conductor wafer and said droplet; means supported by said standard, including means for heating said base tab in a reducing atmosphere when said droplet is disposed against a surface of said body to heat said droplet and said body in accordance with a predetermined time-temperature cycle and means for at the same time applying ultrasonic energy thereto, for forming an alloy-junction therebetween; means supported by said standard for feeding said wire member along a second predetermined axis intersecting said wafer held by said rotatable head at said second position; means for severing said wire, terminated in said droplet joined to said body, at a point spaced from the droplet, said severing means, said rinsing means, said loop-and-pellet heating means, said liquid applying means, and said deforming means comprising a plurality of process stations; a support platform movably mounted on said base and on which said process stations are fixedly supported at predetermined intervals; and means mounted on said base for moving said support platform along a predetermined path to successively dispose individual different ones of said stations at said second position intersected by said second predetermined axis.

9. Apparatus as defined in claim 8 in which said rinsing means includes a multiple-rinse bath comprising: a holder mounted on said platform and rotatable about a predetermined vertical axis perpendicular to said predetermined path; a plurality of reservoirs on said holder spaced equally apart circumferentially around and equally from said vertical axis; means on said standard for vertically reciprocating said wire member, along a second predetermined vertical axis spaced from said first predetermined vertical axis by a distance equal to the median spacing of said reservoirs from said first predetermined axis, relatively between an upper position above said reservoirs and a lower position below the lips thereof, whereby reciprocation of said wire member in proportional timed sequence with rotation of said holder successively projects said wire member into each of said reservoirs.

10. Apparatus as defined in claim 8 in which said deforming means comprises: a hollow cylinder mounted on said platform; a sleeve disposed snugly within one end of said cylinder and having a bore of predetermined diameter to slidably receive said wire member; means supported by said standard for holding said wire member in said bore with said one end portion of said wire member projecting within said cylinder from said sleeve; a piston disposed snugly within the other end of said cylinder; and means for moving said piston relatively toward said sleeve into pinching engagement with said wire member.

11. Apparatus as defined in claim 8 in which said liquid applying means comprises: an upright cup of flexible material mounted on said platform for containing a predetermined volume of said liquid; a vertically disposed plunger having a cup-shaped upper end and movable upwardly within the sidewalls of said upright cup to a predetermined position at which the portion of said flexible material contiguous with said upper end defines a reservoir the lip of which is above the surface of said liquid remaining between the plunger and said sidewalls; and means supported by said standard for moving said wire member downwardly relative to said upright cup to a predetermined position at which said one end portion of said wire member is disposed within said reservoir.

12. Apparatus as defined in claim 8 in which said wire severing apparatus comprises: a forked support mounted on said platform including a pair of leg portions individually having a pair of coaxial apertures; a pair of cutter blades having mutually aligned cutting edges and individually slidably disposed in said apertures along the axis thereof to move into mutual cutting-edge engagement in a predetermined plane; means including a pair of stops on said support for individually limiting closing movement of said cutting edges to a position in said plane; means including a pair of resilient elements on said apparatus for individually urging said cutter blades apart; means including a second pair of stops on said support for individually limiting opening movement of said cutter blades to a predetermined spacing between said cutting edges; and means supported by platform for disposing said support relative to said wire to position the latter in said plane transverse of said cutting edges.

13. A multiple-rinse bath comprising: a base; a standard rigid with respect to said base; a holder mounted on said base and rotatable about a predetermined vertical axis; a plurality of reservoirs on said holder spaced equally apart circumferentially around and equally from said vertical axis; means supported by said standard for vertically reciprocating a member, along a second predetermined vertical axis spaced from said first predetermined vertical axis by a distance equal to the median spacing of said reservoirs from said first predetermined axis, relatively between an upper position above said reservoirs and a lower position below the lips thereof, whereby reciprocation of said member in proportional timed-sequence with rotation of said holder successively projects said member into each of said reservoirs.

14. Apparatus for deforming one end portion of a wire into a loop coaxial with and lying in a plane transverse of the wire comprising: a base; a standard rigid with respect to said base; a hollow cylinder mounted on said base; a sleeve disposed snugly within one end of said cylinder and having a bore of predetermined diameter to slidably receive said wire; means supported by said standard for holding said wire in said bore with said one end portion of said wire projecting within said cylinder from said sleeve; a piston disposed snugly within the other end of said cylinder; and means for moving said piston relatively toward said sleeve into pinching engagement with said wire.

15. Apparatus for immersing one end portion of a member to a predetermined depth within a liquid comprising: a base; a standard rigid with respect to said base; an upright cup mounted from said base and of flexible material for containing a predetermined volume of said liquid; a vertically disposed plunger having a cup-shaped upper end and movable upwardly within the sidewalls of said upright cup to a predetermined position at which the portion of said flexible material contiguous with said upper end defines a reservoir the lip of which is above the surface of said liquid remaining between the plunger and said sidewalls; and means supported by said standard for moving said member downwardly relative to said upright cup to a predetermined position at which said one end portion of said member is disposed within said reservoir.

16. Apparatus for severing a wire terminated in a semi-conductor device comprising: a base; a standard rigid with respect to said base; a forked support mounted on said base and including a pair of leg portions individually having a pair of coaxial apertures; a pair of cutter blades having mutually aligned cutting edges and individually slidably disposed in said apertures along the axis thereof to move into mutual cutting-edge engagement in a predetermined plane; means including a pair of stops on said support for individually limiting closing movement of said cutting edges to a position in said plane; means including a pair of resilient elements on said apparatus for individually urging said cutter blades apart; means including a second pair of stops on said support for individually limiting opening movement of said cutter blades to a predetermined spacing between said cutting edges; and means supported by said standard for disposing said support relative to said wire to position the latter in said plane transverse of said cutting edges.

17. Apparatus for manufacturing a semi-conductor device comprising: means for deforming one end of a straight wire member into a loop lying in a plane transverse of the wire member; means for applying a liquid flux to said loop; means for heating said loop and a pellet suspended therefrom by surface tension forces in said flux to melt said pellet in situ to form a droplet of the pellet material on said loop, said deforming means, said liquid applying means, and said loop-and-pellet heating means constituting a plurality of process stations; a base; a support platform movably mounted on said base and on which said process stations are fixedly supported at predetermined positions; a standard rigid with respect to said base; means supported by said standard, including a head rotatable about a first predetermined axis and movable therealong between first and second positions, for holding a body of semi-conductive material and applying heat to said body when said droplet is disposed against a surface of said body to form an alloy-junction therebetween; means supported by said standard for feeding said wire member along a second predetermined axis intersecting said body held by said rotatable means at said second position; and means mounted on said base for moving said support platform along a predetermined path to successively dispose individual different ones of said stations at said second position intersected by said second predetermined axis.

References Cited in the file of this patent

UNITED STATES PATENTS

| | | |
|---|---|---|
| 309,343 | Glaeser | Dec. 16, 1884 |
| 812,856 | Loss | Feb. 20, 1906 |
| 1,330,468 | Hill | Feb. 10, 1920 |
| 1,457,748 | Raehse | June 5, 1923 |
| 1,619,494 | Wilcox | Mar. 1, 1927 |
| 1,626,652 | Whitmore et al. | May 3, 1927 |
| 1,908,367 | Kiwi | May 9, 1933 |
| 2,308,606 | Ingerson | Jan. 19, 1943 |
| 2,327,715 | Ingerson | Aug. 24, 1943 |
| 2,380,898 | Pimentel | July 31, 1945 |
| 2,392,870 | Whipple | Jan. 15, 1946 |
| 2,644,999 | Hill | July 14, 1953 |
| 2,669,014 | Neilsen | Feb. 16, 1954 |
| 2,675,609 | Miller | Apr. 20, 1954 |
| 2,701,291 | Cowles | Feb. 1, 1955 |
| 2,732,614 | Shower | Jan. 31, 1956 |
| 2,764,953 | Mullan | Oct. 2, 1956 |
| 2,795,687 | Hall et al. | June 11, 1957 |
| 2,869,509 | Woods | Jan. 20, 1959 |